No. 749,454. PATENTED JAN. 12, 1904.
J. S. SCOTT.
BOLT HOLDING IMPLEMENT.
APPLICATION FILED MAR. 28, 1903.
NO MODEL.
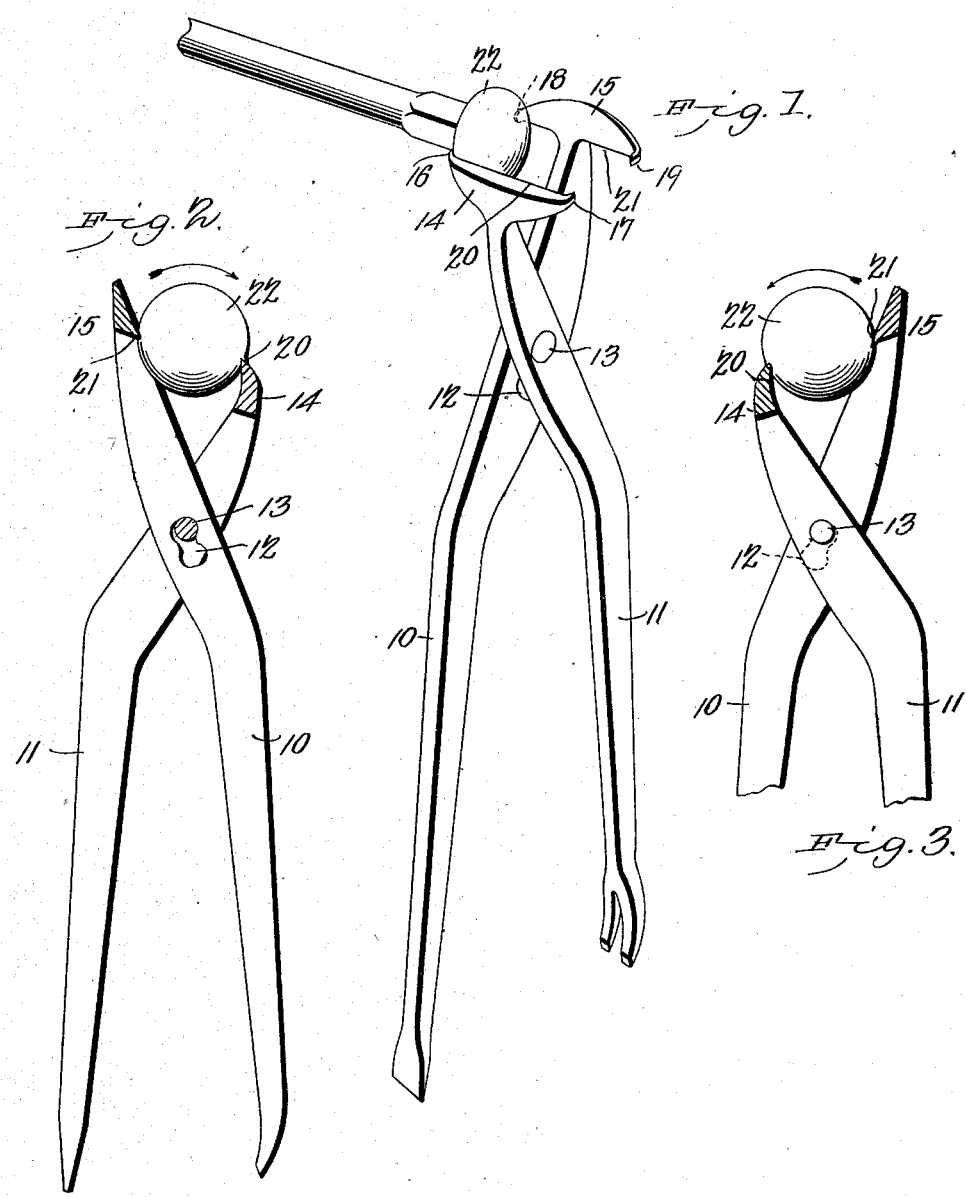
Witnesses
Jasper S. Scott, Inventor.
by C. A. Snow & Co.
Attorneys No. 749,454. Patented January 12, 1904.

UNITED STATES PATENT OFFICE.

JASPER S. SCOTT, OF SAN JOSE, CALIFORNIA, ASSIGNOR OF ONE-HALF TO A. E. SHEPARD, OF SAN JOSE, CALIFORNIA.

BOLT-HOLDING IMPLEMENT.

SPECIFICATION forming part of Letters Patent No. 749,454, dated January 12, 1904.

Application filed March 28, 1903. Serial No. 150,045. (No model.)

*To all whom it may concern:*

Be it known that I, JASPER S. SCOTT, a citizen of the United States, residing at San Jose, in the county of Santa Clara and State of California, have invented a new and useful Bolt-Holding Implement, of which the following is a specification.

This invention relates to devices employed for holding bolts from turning while the nuts are being turned on or off, and has for its object to produce a simply-constructed and easily applied and operated implement by which the head of a bolt may be firmly held from turning and which is reversible, so that the bolt may be held from turning in either direction; and the invention consists in certain novel features of the construction, as hereinafter shown and described, and specified in the claims.

In the drawings illustrative of the invention, in which corresponding parts are denoted by like designating characters, Figure 1 is a perspective view of the device applied. Figs. 2 and 3 are sectional views illustrating the implement applied to opposite sides of the bolt.

The improved device consists of handle members 10 11, one having an elongated aperture 12 and the other with a circular aperture adapted to register with the opposite ends of said elongated aperture and the two parts pivotally united by a pivot-bolt 13, passing through the apertures, whereby the handle members are movably connected and one member movable longitudinally of the other within the range of the elongated aperture. The elongated aperture is contracted centrally, as shown, so that the movement of the pivot-bolt from end to end of the aperture will be retarded somewhat, the object to be hereinafter explained. The handle members terminate beyond the pivot-bolt in opposing jaws 14 15, extended laterally upon opposite sides and terminating in inwardly-extending points or lugs 16 17 and 18 19, respectively, the lugs thus standing at right angles to the operating-faces of the jaws. The jaws are of unequal length, as shown, and are formed with reversely-disposed knife-edged corners, as shown at 20 21, the knife-edge 20 extending away from the pivot-bolt 13 and the knife-edge 21 extending toward the pivot-bolt, as indicated.

When a bolt is to be held to enable the nut to be screwed upon the bolt, the head (indicated at 22) is grasped by the implement, with the points 16 and 18 beneath the head or between the structure held by the bolt and the head. This position will cause the knife-edge surfaces 20 21 to engage the bolt-head in opposing positions, as indicated in Fig. 2, and effectually resist any rotary movement in the direction of the arrow. When a nut is to be unscrewed, the implement is reversed and the lugs 17 19 engaged with the head, which will likewise reverse the relative positions of the knife-edges and effectually prevent the reverse movement of the bolt, as will be obvious by reference to Fig. 3, which represents the reversed relative positions.

By moving the pivot-bolt from end to end of the elongated aperture 12 the implement may be adapted to different-sized bolt-heads, and by forming the aperture with the contracted central portion two independent spaced sockets are formed for the pivot-bolt, into which it will be held by the lateral resistance with sufficient force to prevent displacement when the device is operated in either of its two positions. This is an important feature of the invention and adds materially to the efficiency and usefulness of the invention.

The implement may be of any size and adapted to operate upon bolt-heads of any size or shape and will be found very convenient and efficient for the purposes designated.

Having thus described my invention, what I claim is—

1. A bolt-holder consisting of two pivotally-connected members, each comprising a handle and a gripping-jaw disposed at right angles to the handle and terminating in inwardly-bent lugs adapted to extend beneath the head of a bolt and contact with the under side thereof.

2. A bolt-holder consisting of two pivotally-connected members, each comprising a handle and a knife-edged gripping-jaw disposed at right angles to the handle and terminating in inwardly-bent lugs adapted to extend beneath the head of a bolt and contact with the under side thereof.

3. A bolt-holder consisting of two pivotally-connected members, each comprising a handle and a knife-edged gripping-jaw disposed at right angles to the handle and terminating in inwardly-bent lugs, said jaws being at unequal distances from the pivotal point.

4. A bolt-holder consisting of two pivotally-connected members, each comprising a handle and a knife-edged gripping-jaw disposed at right angles to the handle and terminating in inwardly-bent lugs, said jaws being at unequal distances from the pivotal point and being oppositely disposed.

5. A bolt-holder consisting of two pivotally-connected members, each comprising a handle and a gripping-jaw disposed at right angles to the handle and terminating in inwardly-bent lugs, one of said members bearing a pivot-pin and the other having an elongated opening for engagement therewith.

6. A bolt-holder consisting of two pivotally-connected members, each comprising a handle and a gripping-jaw disposed at right angles to the handle and terminating in inwardly-bent lugs, one of said members bearing a pivot-pin and the other having a pivot-opening constricted intermediate of its ends.

In testimony that I claim the foregoing as my own I have hereto affixed my signature in the presence of two witnesses.

JASPER S. SCOTT.

Witnesses:
A. E. SHEPARD,
D. D. TENNYSON.